United States Patent
Chen

(10) Patent No.: US 11,412,433 B2
(45) Date of Patent: Aug. 9, 2022

(54) METHOD OF PROCESSING BEAM FAILURE RECOVERY AND USER EQUIPMENT

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 103 days.

(21) Appl. No.: 16/753,618

(22) PCT Filed: Oct. 17, 2018

(86) PCT No.: PCT/CN2018/110657
§ 371 (c)(1),
(2) Date: Apr. 3, 2020

(87) PCT Pub. No.: WO2019/076319
PCT Pub. Date: Apr. 25, 2019

(65) Prior Publication Data
US 2020/0245214 A1    Jul. 30, 2020

(30) Foreign Application Priority Data
Oct. 20, 2017   (CN) .......................... 201710982757.9

(51) Int. Cl.
*H04W 36/30*   (2009.01)
*H04W 36/06*   (2009.01)

(52) U.S. Cl.
CPC ......... *H04W 36/305* (2018.08); *H04W 36/06* (2013.01)

(58) Field of Classification Search
None
See application file for complete search history.

(56) References Cited

U.S. PATENT DOCUMENTS

| | | | | |
|---|---|---|---|---|
| 10,574,329 B2* | 2/2020 | Nagaraja | .............. | H04B 7/0695 |
| 10,659,137 B2* | 5/2020 | Määttanen | ........... | H04B 7/0695 |
| 10,743,326 B2* | 8/2020 | da Silva | .............. | H04W 72/085 |
| 10,873,866 B2* | 12/2020 | Kim | .................... | H04W 56/001 |
| 10,880,761 B2* | 12/2020 | Nagaraja | .............. | H04W 74/04 |
| 10,952,273 B2* | 3/2021 | Akoum | ................. | H04W 76/19 |
| 10,972,152 B2* | 4/2021 | Koskela | ................ | H04W 76/19 |
| 10,979,127 B2* | 4/2021 | Zhang | .................. | H04W 80/02 |
| 11,082,286 B2* | 8/2021 | Pan | ................... | H04W 72/0413 |

(Continued)

FOREIGN PATENT DOCUMENTS

| | | |
|---|---|---|
| CN | 101998431 A | 3/2011 |
| CN | 103945408 A | 7/2014 |

(Continued)

OTHER PUBLICATIONS

CN Search Report in Application No. 201710982757.9 dated Jun. 1, 2020.

(Continued)

*Primary Examiner* — Tri H Phan
(74) *Attorney, Agent, or Firm* — Maschoff Brennan

(57) ABSTRACT

A method of processing beam failure recovery and a UE are provided. The method includes: controlling a behavior of monitoring a target beam by the UE and/or a behavior of monitoring a RLM process by the UE in the case that a preset condition for beam failure recovery is met; declaring a RLF or receiving data through the target beam.

18 Claims, 4 Drawing Sheets

--- controlling the UE to stop monitoring the RLM process, when requesting a beam failure recovery of the UE or during a preset period after requesting a beam failure recovery of the UE — 501 declaring the RLF directly in the case that the beam failure recovery of the UE fails, or controlling a timer configured to control RLM to restart or continue running and declaring the RLF in the case that the timer expires — 502 receiving the data through the target beam in the case that the beam failure recovery of the UE is successful — 503

(56) References Cited

U.S. PATENT DOCUMENTS

| | | | |
|---|---|---|---|
| 11,134,492 B2* | 9/2021 | Guo | H04W 72/042 |
| 11,160,129 B2* | 10/2021 | Zhang | H04W 88/06 |
| 11,184,920 B2* | 11/2021 | Amuru | H04W 74/004 |
| 11,245,568 B2* | 2/2022 | Chen | H04W 24/04 |
| 11,277,191 B2* | 3/2022 | Jeong | H04W 76/19 |
| 2011/0021154 A1 | 1/2011 | Marinier et al. | |
| 2016/0353510 A1 | 12/2016 | Zhang et al. | |
| 2019/0174385 A1* | 6/2019 | Sang | H04W 76/19 |
| 2020/0145091 A1 | 5/2020 | Luo et al. | |
| 2021/0136612 A1* | 5/2021 | Lee | H04W 24/10 |

FOREIGN PATENT DOCUMENTS

| | | |
|---|---|---|
| CN | 106793124 A | 5/2017 |
| CN | 107005858 A | 8/2017 |
| WO | 2017/024516 A1 | 2/2017 |
| WO | 2018/228468 A1 | 12/2018 |

OTHER PUBLICATIONS

"Discussion on beam failure recovery" 3GPP TSG RAN WG1 Meeting #90bis, Oct. 9, 2017.

"Remaining issues on beam recovery" 3GPP TSG RAN WG1 meeting #90bis, Oct. 9, 2017.

Written Opinion and International Search Report in Application No. PCT/CN2018/110657 dated Apr. 30, 2020.

EP Search Report in Application No. 18867586.2 dated Nov. 12, 2020.

"Beam failure recovery procedure" 3GPP TSG RAN WG1 Meeting NR Ad-Hoc#2, Jun. 27, 2017.

"Remaining issues and text proposals on mechanism to recover beam failure" 3GPP TSG RAN WG1 Meeting AH 1801, Jan. 22, 2018.

"Beam Failure Events and Criteria for Declaring Radio Link Failure" 3GPP TSG-RAN WG2 #99, Aug. 21, 2017.

Ericsson, "Basic beam recovery," 3GPP TSG-RAN WG1 NR Ad Hoc #3, R1-1716351, pp. 1-8, (Sep. 18-21, 2017).

NTT Docomo, "Views on beam recovery," 3GPP TSG RAN WG1 Meeting #90b, R1-1718193, pp. 1-9, (Oct. 9-13, 2017).

NEC, "RLF declaration after beam recovery failure," 3GPP TSG-RAN WG2 #99bis, R2-1711615, pp. 1-4, (Oct. 9-13, 2017).

Samsung, "Aperiodic indications based on Beam Recovery," 3GPP TSG-RAN WG2 2017 RAN2#99bis Meeting, R2-1711713, pp. 1-6, (Oct. 9-13, 2017).

IN Office Action dated Jul. 30, 2021 as received in Application No. 202027020113.

JP Office Action dated Jun. 29, 2021 as received in Application No. 2020-521291.

* cited by examiner

METHOD OF PROCESSING BEAM FAILURE RECOVERY AND USER EQUIPMENT

CROSS REFERENCE OF RELATED APPLICATION

The present application is the U.S. national phase of PCT Application PCT/CN2018/110657 filed on Oct. 17, 2018, which claims a priority of Chinese patent application No. 201710982757.9 filed on Oct. 20, 2017, which is incorporated herein by reference in its entirety.

TECHNICAL FIELD

The present disclosure relates to the field of communications technologies, and in particular to a method of processing beam failure recovery and a UE.

BACKGROUND

In the research on the next-generation communication system after the fourth-generation mobile communication (4G) system, it is currently intended to increase the working frequency band supported by the communication system to more than 6 GHz, up to about 100 GHz. The high frequency band has relatively abundant idle frequency resources, which can provide greater throughput for data transmission. Currently, 3GPP has completed a modeling of high-frequency channels. The high-frequency signal has a short wavelength. Compared with the low-frequency band, it can arrange more antenna elements on the panel with the same size, and uses beamforming technology to form a beam with stronger directivity and narrower lobes.

In the high-frequency communication system, because the wavelength of the wireless signal is short, the signal propagation is blocked and the like, which causes the signal propagation to be interrupted. If the wireless link reconstruction in the prior art is adopted, it takes a long time, so a beam failure recovery process is introduced, that is, the UE monitors the beam failure detection reference signal sent by the base station at the physical layer, and evaluates whether the quality of the reference signal meets the triggering condition of the beam failure. Once the condition is met, the UE may send a beam failure recovery request (beam failure recovery request) to the base station. Based on the beam failure recovery request, the base station determines a new candidate transmission beam for control information or data transmission. The above beam failure recovery process enables the communication system to quickly switch to a spare beam pair link (BPL) to continue transmitting control messages and data, thereby achieving a beam failure recovery, avoiding a wireless link failure, and effectively improving the links robustness. The spare BPL includes a new candidate transmission beam and a reception beam described above.

As for the radio link failure (RLF for short), it is the related art and belongs to the L3 process. The applicable scenario of RLF may be: reaching the maximum number of retransmissions indicated by the RLC layer, receiving a random access problem indication, a long period of L1 problems (triggered by so-called out-of-sync indications), and the like. In radio link monitoring (RLM for short), a terminal (User Equipment, UE for short) evaluates the downlink radio quality (DL radio quality) of each frame, for example, the channel quality of Physical Downlink Control Channel (PDCCH), compared with the $Q_{in}$ and $Q_{out}$ thresholds (which are inherent to the UE, and the threshold is obtained by the UE through testing). When the DL radio quality is lower than $Q_{out}$, the UE indicates an out-of-sync to its upper layer; when the DL radio quality is greater than $Q_{in}$, the UE indicates an in-sync to its upper layer. Based on these indications, the UE declares RLF. The recovery process of RLF is RRC reconstruction.

Currently, at the 88bis meeting of 3 GPP RAN1, the following conclusions have been reached regarding the UE beam failure recovery mechanism:

The UE beam failure recovery mechanism includes the following aspects:

Beam failure detection;
New candidate beam identification;
Beam failure recovery request sent;
The UE monitors the beam failure recovery and requests the base station gNB to respond.

Among them, the new candidate beam identification may be located before the beam failure detection or after the beam failure detection.

However, in the related art, the behavior of the UE during and after the beam failure recovery is not clear, so it is unable to ensure the flexibility of the communication process.

SUMMARY

In a first aspect, a method of processing beam failure recovery is provided in an embodiment of the present disclosure, applied to a UE, including:

controlling a behavior of monitoring a target beam by the UE and/or a behavior of monitoring a Radio Link Monitoring (RLM) process by the UE in the case that a preset condition for beam failure recovery is met;

declaring a Radio Link Failure (RLF) or receiving data through the target beam.

In a second aspect, a UE is further provided in an embodiment of the present disclosure, including:

a control module, configured to control a behavior of monitoring a target beam by the UE and/or a behavior of monitoring a Radio Link Monitoring (RLM) process by the UE in the case that a preset condition for beam failure recovery is met;

a first processing module, configured to declare a Radio Link Failure (RLF) or receive data through the target beam.

In a third aspect, a UE is further provided in an embodiment of the present disclosure, including a memory, a processor and a program stored in the memory and executable on the processor, where the program is executed by the processor to perform the method of processing beam failure recovery hereinabove.

In a fourth aspect, a computer-readable storage medium is further provided in an embodiment of the present disclosure, where a program in the computer-readable storage medium, and the program is executed by a processor to perform the method of processing beam failure recovery hereinabove.

BRIEF DESCRIPTION OF THE DRAWINGS

In order to illustrate the technical solution of the embodiments of the present disclosure more clearly, the drawings used in the description of the embodiments of the present disclosure will be briefly described below. Obviously, the drawings in the following description are merely some embodiments of the present disclosure. For those of ordinary skill in the art, other drawings may be obtained based on these drawings without creative work.

DETAILED DESCRIPTION

In order to explain the technical solution of the embodiments of the present disclosure more clearly, the drawings used in the embodiments of the present disclosure will be briefly introduced below. Obviously, the drawings in the following description are only some embodiments of the present disclosure. Those skilled in the art can also obtain other drawings according to these drawings without paying creative labor.

A method of processing beam failure recovery and a UE are provided in the embodiments of the present disclosure, so as to make clear the behavior of the UE during and after the beam failure recovery, thereby ensuring the flexibility of the communication process.

Figure 1:
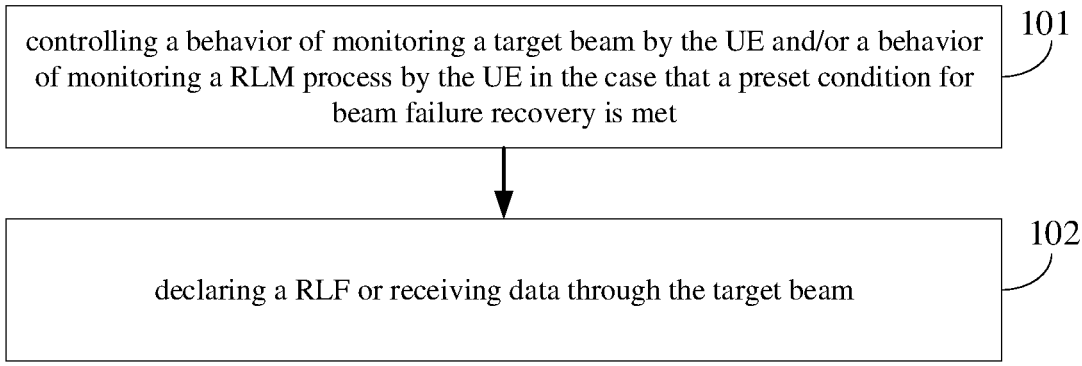
FIG. 1 is a flowchart of a method of processing beam failure recovery in an embodiment of the present disclosure.

Referring to FIG. 1, a method of processing beam failure recovery is provided in an embodiment of the present disclosure, which is applied to a UE and includes the following steps:

Step 101: controlling a behavior of monitoring a target beam by the UE and/or a behavior of monitoring a Radio Link Monitoring (RLM) process by the UE in the case that a preset condition for beam failure recovery is met.

In the embodiment of the present disclosure, when the UE controls the behavior of monitoring the target beam, the UE may control the UE to stop monitoring the target beam, or may control the UE to monitor the target beam. When the UE controls the behavior of monitoring the RLM process, the UE may control the UE to stop monitoring the RLM process, or control the UE to monitor the RLM process or restart the monitoring of the RLM process. The preset condition of the beam failure recovery may be after the beam failure recovery of the UE fails, or when requesting a beam failure recovery of the UE, or within a preset period after requesting a beam failure recovery of the UE.

Specifically, step 101 may include:

controlling the UE to monitor the target beam, in the case that a beam failure recovery of the UE fails; or controlling the UE to stop monitoring the target beam and controlling the UE to monitor the RLM process, in the case that a beam failure recovery of the UE fails, where when stopping the monitoring of the RLM process, the UE may stop monitoring the target beam or continue to monitor the target beam; or controlling the UE to stop monitoring the RLM process, in the case that a beam failure recovery of the UE fails; or controlling the UE to stop monitoring the RLM process, when requesting a beam failure recovery of the UE or during a preset period after requesting a beam failure recovery of the UE.

Step 102: declaring a Radio Link Failure (RLF) or receiving data through the target beam.

In the embodiment of the present disclosure, when the UE declares the RLF, the UE mainly declares the RLF to an upper layer of the UE (for example, a radio resource control layer RRC layer).

The target beam may be at least one of the following beams:

a beam in a beam list for beam management;

a beam corresponding to beam information stored in the UE;

a beam for RLM; and all or a part of candidate beams.

According to the method of processing beam failure recovery in the embodiment of the present disclosure, after a preset condition for beam failure recovery is met, the UE is controlled to monitor the behavior of the target beam and/or the RLM process, declare RLF, or receive data through the target beam, so as to make clear the behavior of the UE during and after the beam failure recovery and allow the UE to behave differently in different scenarios, thereby ensuring the continuity of service transmission as much as possible, saving power consumption of the UE, and ensuring the flexibility of the communication process.

Figure 2:
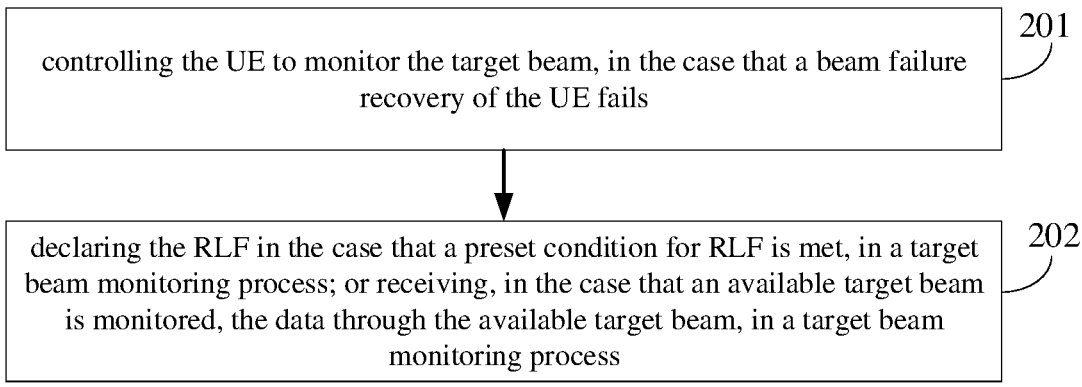
FIG. 2 is a flowchart of a method of processing beam failure recovery in another embodiment of the present disclosure.

Referring to FIG. 2, a method of processing beam failure recovery is provided in an embodiment of the present disclosure, which is applied to a UE and includes the following steps:

Step 201: controlling the UE to monitor the target beam, in the case that a beam failure recovery of the UE fails.

Step 202: declaring the RLF in the case that a preset condition for RLF is met, in a target beam monitoring process; or receiving, in the case that an available target beam is monitored, the data through the available target beam, in a target beam monitoring process.

The preset conditions of the RLF are, for example, the timer (T310) based on the in-sync/out-of-sync indication expires, a random access procedure failure detection, a radio link control layer RLC failure detection, etc.

In this way, after the UE's beam failure recovery fails, the UE is controlled to monitor the target beam, which may enable the UE to monitor the available beam and achieve the beam failure recovery, thereby avoiding a radio link interruption and restoring the radio link connection through a reconstruction, ensuring the continuity of service transmission as much as possible and saving UE power consumption.

Further, after subsequent to the receiving, in the case that the available target beam is monitored, the data through the available target beam, the method may further include:

sending synchronization indication information for the RLM to a UE upper layer; or sending indication information to a UE upper layer; where the indication information is configured to indicate at least one of: the UE upper layer restarts the RLM directly, the UE upper layer stops the RLM directly, and the UE upper layer stops a timer (e.g., T310, T311) configured to control the RLM, and the UE upper layer may be a RRC layer for example.

Figure 3:
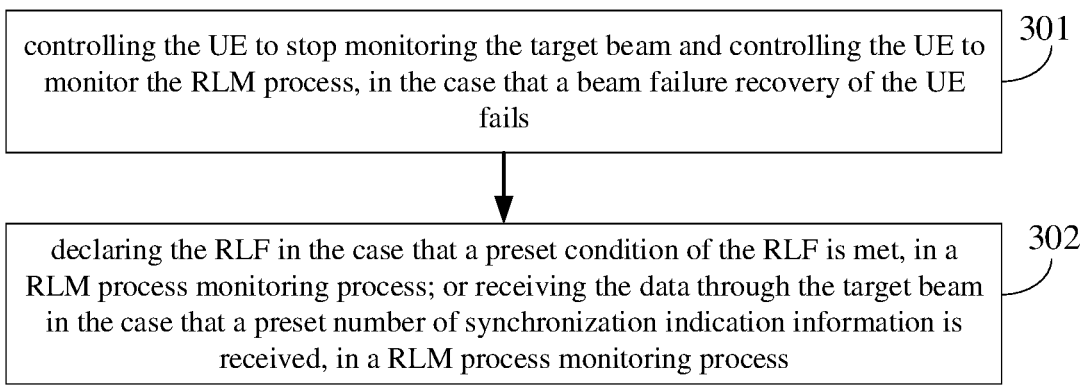
FIG. 3 is a flowchart of a method of processing beam failure recovery in another embodiment of the present disclosure.

Referring to FIG. 3, a method of processing beam failure recovery is provided in an embodiment of the present disclosure, which is applied to a UE and includes the following steps:

Step 301: controlling the UE to stop monitoring the target beam and controlling the UE to monitor the RLM process, in the case that a beam failure recovery of the UE fails.

Step 302: declaring the RLF in the case that a preset condition of the RLF is met, in a RLM process monitoring process; or receiving the data through the target beam in the case that a preset number of synchronization indication information is received, in a RLM process monitoring process.

The preset conditions of the RLF are, for example, a timer (T310) based on an in-sync/out-of-sync indication timeout, a random access procedure failure detection, a radio link control RLC failure detection, and the like.

Optionally, the preset number of synchronization indication information may be continuous, for example, N, where N is a positive integer greater than or equal to 1.

In this way, after the beam failure recovery of the UE fails, the UE is controlled to stop monitoring the target beam, which can save power consumption of the UE.

Figure 4:
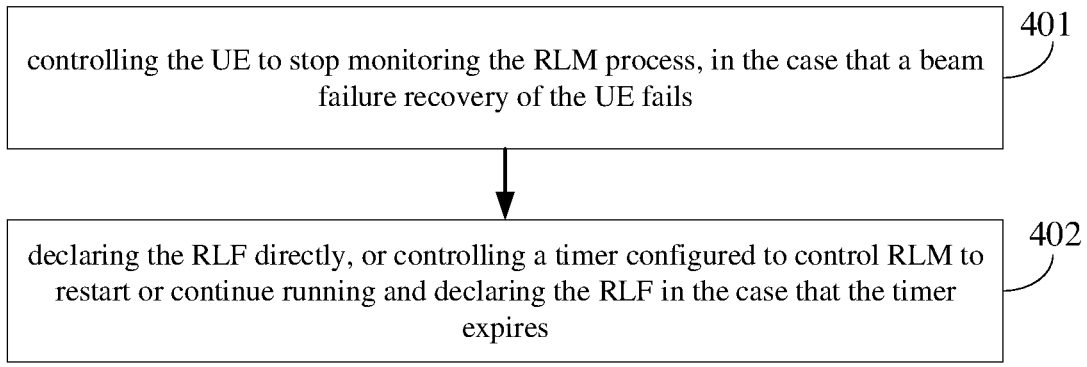
FIG. 4 is a flowchart of a method of processing beam failure recovery in another embodiment of the present disclosure.

Referring to FIG. 4, a method of processing beam failure recovery is provided in an embodiment of the present disclosure, which is applied to a UE and includes the following steps:

Step 401: controlling the UE to stop monitoring the RLM process, in the case that a beam failure recovery of the UE fails.

In the embodiment of the present disclosure, when stopping monitoring the RLM process, the UE may stop or continue monitoring the target beam. When there are multiple RLM processes, the controlling the UE stopping monitoring the RLM process may specifically include: controlling the UE to stop monitoring a part or all of the RLM processes.

Optionally, the multiple RLM processes may correspond to, for example, multiple RLM monitoring thresholds, multiple RLM counters or timers, multiple reference signals RS for RLM, or multiple broadband part BWPs.

In the case that the monitoring of a part of the RLM processes is stopped, for the part of the RLM processes of which the monitoring is stopped, no in-sync indication information or out-of-sync indication information is sent to a UE upper layer.

Step 402: declaring the RLF directly, or controlling a timer configured to control RLM to restart or continue running and declaring the RLF in the case that the timer expires.

It should be noted that the timer in this step is, for example, T310. In the case that there are multiple RLM processes, when stopping monitoring some RLM processes, the UE may declare RLF to the upper layer when the number of RLM processes of which the monitoring is stopped reaches a preset number; when stopping monitoring all RLM processes, the UE may declare RLF to the upper layer after stopping monitoring all RLM processes.

Figure 5:
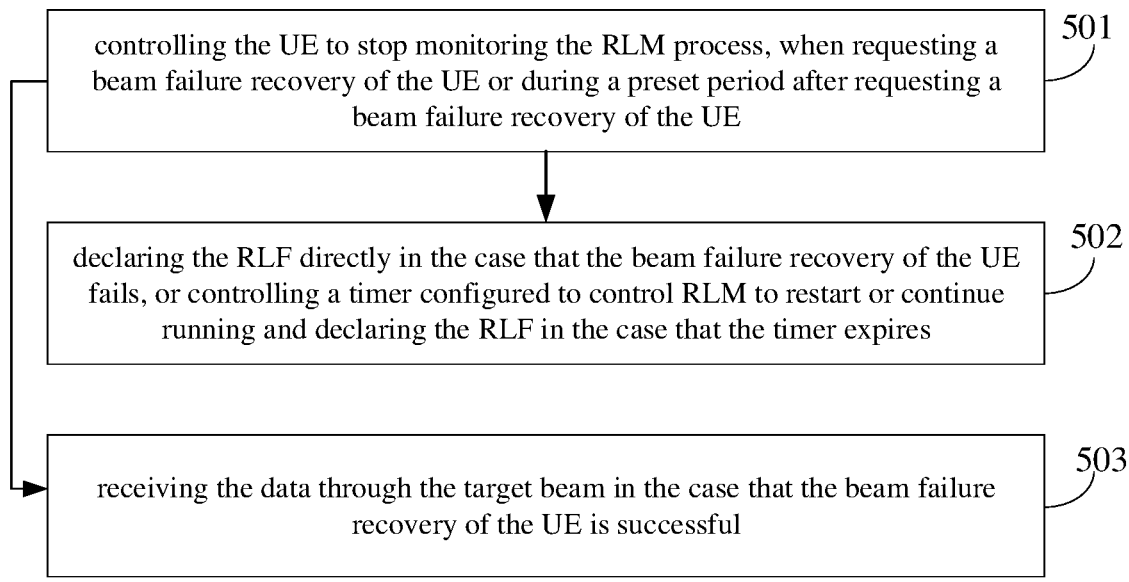
FIG. 5 is a flowchart of a method of processing beam failure recovery in another embodiment of the present disclosure.

In addition, Referring to FIG. 5, a method of processing beam failure recovery is provided in an embodiment of the present disclosure, which is applied to a UE and includes the following steps:

Step 501: controlling the UE to stop monitoring the RLM process, when requesting a beam failure recovery of the UE or during a preset period after requesting a beam failure recovery of the UE.

When there are multiple RLM processes, the controlling the UE to stop monitoring the RLM process may specifically be: controlling the UE to stop monitoring some or all of the RLM processes. Optionally, the multiple RLM processes may correspond to, for example, multiple RLM monitoring thresholds, multiple RLM counters or timers, multiple reference signals RS for RLM, or multiple broadband part BWPs.

In the case that the monitoring of a part of the RLM processes is stopped, for the part of the RLM processes of which the monitoring is stopped, no in-sync indication information or out-of-sync indication information is sent to a UE upper layer.

Step 502: declaring the RLF directly in the case that the beam failure recovery of the UE fails, or controlling a timer configured to control RLM to restart or continue running and declaring the RLF in the case that the timer expires.

The timer in this step is, for example, T310. Further, the method in the embodiment of the present disclosure may further include:

sending, to a UE upper layer, indication information configured to indicate that the beam failure recovery fails, in the case that the beam failure recovery of the UE fails.

Step 503: receiving the data through the target beam in the case that the beam failure recovery of the UE is successful.

Further, in the case that the beam failure recovery of the UE is successful, the method in the embodiment of the present disclosure may further include:

resuming or restarting monitoring the RLM process; and/or sending, to a UE upper layer, indication information configured to indicate that the beam failure recovery is successful.

The foregoing embodiment describes the method of processing beam failure recovery of the present disclosure, and a UE corresponding to the method of processing beam failure recovery of the present disclosure will be described below with reference to the embodiments and the drawings.

Figure 6:
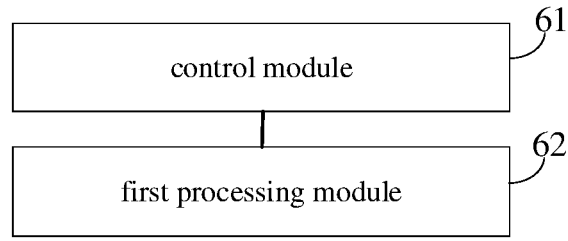
FIG. 6 is a first schematic structural diagram of a UE in an embodiment of the present disclosure.

Referring to FIG. 6, a UE is further provided in an embodiment of the present disclosure, which includes a control module 61 and a first processing module 62, which are described in detail below.

The control module 61 is configured to control a behavior of monitoring a target beam by the UE and/or a behavior of monitoring a Radio Link Monitoring (RLM) process by the UE in the case that a preset condition for beam failure recovery is met.

The first processing module 62 is configured to declare a Radio Link Failure (RLF) or receive data through the target beam According to the UE in the embodiment of the present disclosure, after a preset condition for beam failure recovery is met, the UE is controlled to monitor the behavior of the target beam and/or the RLM process, declare RLF, or receive data through the target beam, so as to make clear the behavior of the UE during and after the beam failure recovery and allow the UE to behave differently in different scenarios, thereby ensuring the continuity of service transmission as much as possible, saving power consumption of the UE, and ensuring the flexibility of the communication process.

In the embodiment of the present disclosure, the control module 61 is further configured to:

control the UE to monitor the target beam, in the case that a beam failure recovery of the UE fails; or control the UE to stop monitoring the target beam and control the UE to monitor the RLM process, in the case that a beam failure recovery of the UE fails; or control the UE to stop monitoring the RLM process, in the case that a beam failure recovery of the UE fails; or control the UE to stop monitoring the RLM process, when requesting a beam failure recovery of the UE or during a preset period after requesting a beam failure recovery of the UE.

Optionally, the UE is controlled to monitor the target beam in the case that the beam failure recovery of the UE fails, and the first processing module 62 is further configured to:

declare the RLF in the case that a preset condition for RLF is met, in a target beam monitoring process; or receive, in the case that an available target beam is monitored, the data through the available target beam, in a target beam monitoring process.

Figure 7:
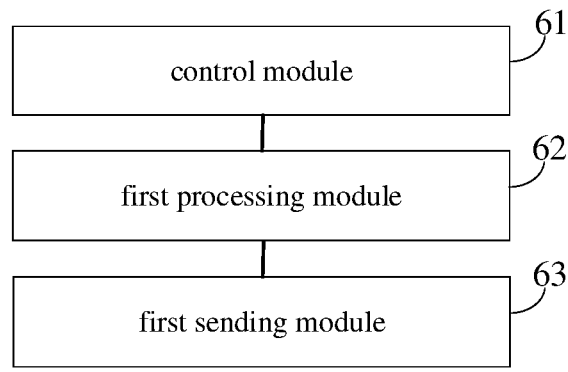
FIG. 7 is a second schematic structural diagram of a UE in an embodiment of the present disclosure.

Optionally, as shown in FIG. 7, the UE further includes: a first sending module 63, configured to, after monitoring an available target beam and receiving the data through the available target beam, send synchronization indication information for the RLM to a UE upper layer or send indication information to a UE upper layer;

where the indication information is configured to indicate at least one of: the UE upper layer restarts the RLM directly, the UE upper layer stops the RLM directly, and the UE upper layer stops a timer configured to control the RLM.

Optionally, the UE is controlled to stop monitoring the target beam and to monitor the RLM process in the case that the beam failure recovery of the UE fails, the first processing module 62 is further configured to:

declare the RLF in the case that a preset condition for the RLF is met, in a RLM process monitoring process; or receive the data through the target beam in the case that a preset number of synchronization indication information is received, in a RLM process monitoring process.

Optionally, the preset number of synchronization indication information are continuous.

Optionally, the target beam includes at least one of:
a beam in a beam list for beam management;
a beam corresponding to beam information stored in the UE;
a beam for RLM; and
all or a part of candidate beams.

Optionally, the UE is controlled to stop monitoring the RLM process in the case that the beam failure recovery of the UE fails, the first processing module 62 is further configured to:

declare the RLF directly, or control a timer configured to control RLM to restart or continue running and declare the RLF in the case that the timer expires.

Optionally, the UE is controlled to stop monitoring the RLM process when requesting the beam failure recovery of the UE or during the preset period after requesting the beam failure recovery of the UE, the first processing module 62 is further configured to:

declare the RLF directly in the case that the beam failure recovery of the UE fails, or control a timer configured to control RLM to restart or continue running and declare the RLF in the case that the timer expires, or receive the data through the target beam in the case that the beam failure recovery of the UE is successful.

Figure 8:
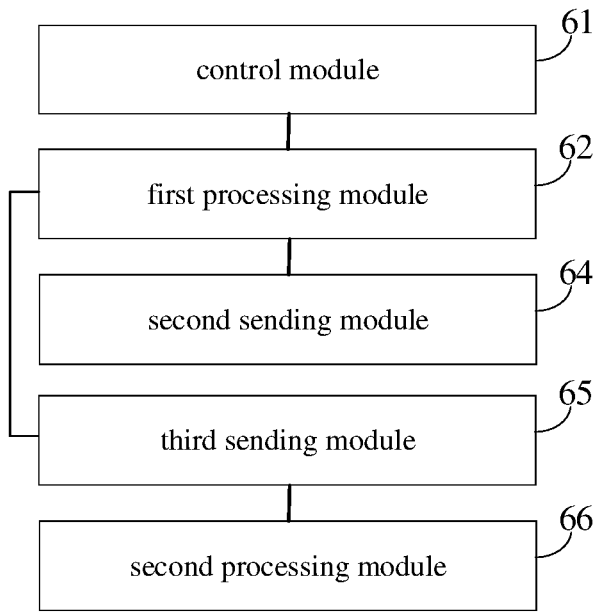
FIG. 8 is a third schematic structural diagram of a UE in an embodiment of the present disclosure.

Optionally, as shown in FIG. 8, the UE further includes: a second sending module 64, configured to send, to a UE upper layer, indication information configured to indicate that the beam failure recovery fails, in the case that the beam failure recovery of the UE fails.

Optionally, as shown in FIG. 8, the UE further includes: a third sending module 65 and a second processing module 66.

The third sending module 65 is configured to send, to a UE upper layer, indication information configured to indicate that the beam failure recovery is successful, in the case that the beam failure recovery of the UE is successful.

The second processing module 66 is configured to resume or restart monitoring the RLM process in the case that the beam failure recovery of the UE is successful.

Optionally, in the case that there are a plurality of RLM processes, the control module 61 is further configured to:

control the UE to stop monitoring a part or all of the RLM processes.

Optionally, in the case that the monitoring of a part of the RLM processes is stopped, for the part of the RLM processes of which the monitoring is stopped, no in-sync indication information or out-of-sync indication information is sent to a UE upper layer.

In addition, a UE is further provided in an embodiment of the present disclosure, including a processor, a memory, and a computer program stored in the memory and executable on the processor, the computer program is executed by the processor to perform the method of processing beam failure recovery applied to a UE, and the same technical effects may be achieved. To avoid repetition, details are not described herein again.

Figure 9:
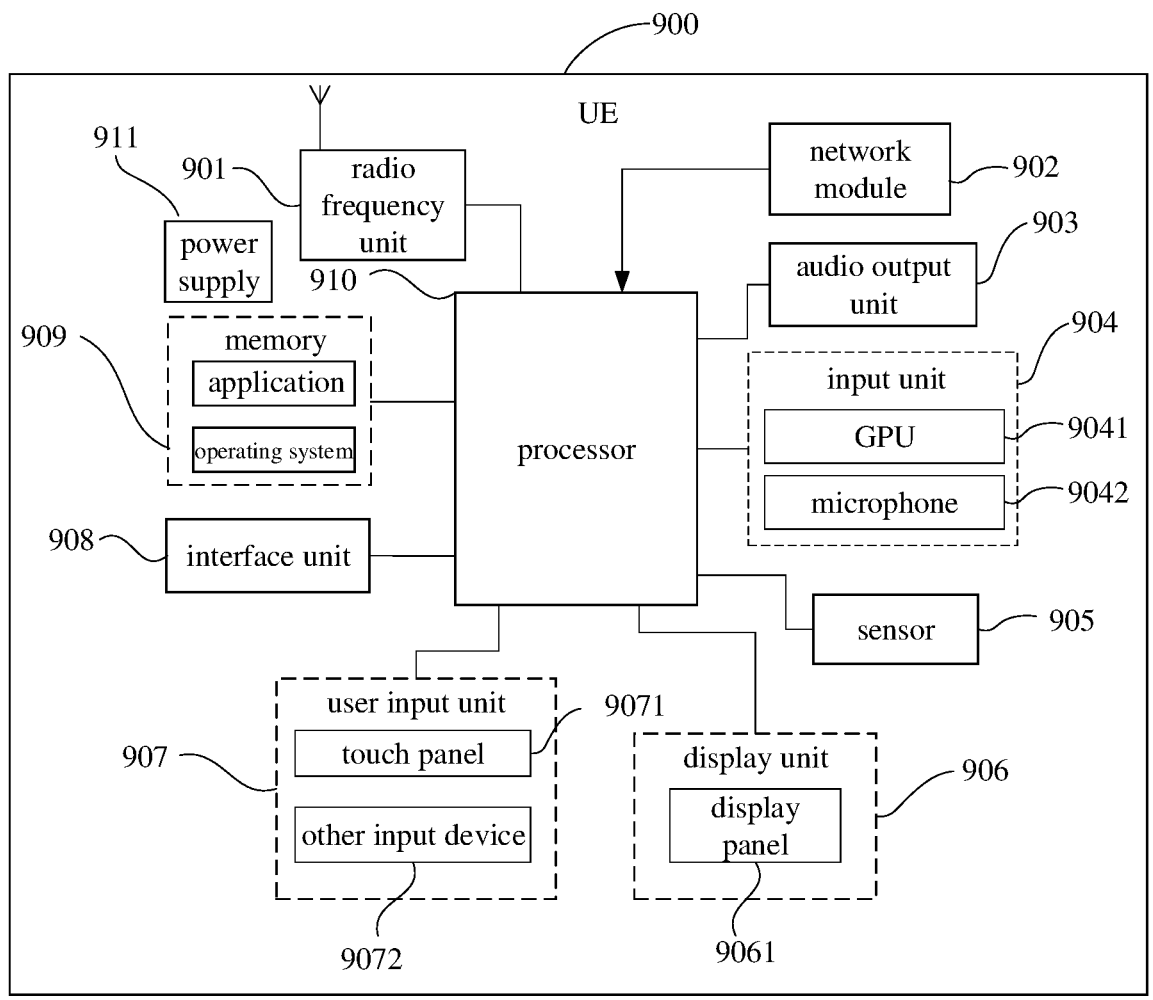
FIG. 9 is a fourth schematic structural diagram of a UE in an embodiment of the present disclosure.

Specifically, FIG. 9 is a schematic diagram of a hardware structure of a UE that implements various embodiments of the present disclosure. The UE 900 includes, but is not limited to, a radio frequency unit 901, a network module 902, an audio output unit 903, an input unit 904, a sensor 905, and a display unit. 906, a user input unit 907, an interface unit 908, a memory 909, a processor 910, and a power supply 911 and other components. Those skilled in the art can understand that the UE structure shown in FIG. 9 does not constitute a limitation on the UE, and the UE may include more or fewer components than shown in the figure, or combine certain components, or arrange different components. In the embodiment of the present disclosure, the UE includes, but is not limited to, a mobile phone, a tablet computer, a notebook computer, a palmtop computer, a car UE, a wearable device, a pedometer, and the like.

The processor 910 is configured to control a behavior of monitoring a target beam by the UE and/or a behavior of monitoring a RLM process by the UE in the case that a preset condition for beam failure recovery is met; declare a RLF or receiving data through the target beam.

According to the UE 900 in the embodiment of the present disclosure, after a preset condition for beam failure recovery is met, the UE is controlled to monitor the behavior of the target beam and/or the RLM process, declare RLF, or receive data through the target beam, so as to make clear the behavior of the UE during and after the beam failure recovery and allow the UE to behave differently in different scenarios, thereby ensuring the continuity of service transmission as much as possible, saving power consumption of the UE, and ensuring the flexibility of the communication process.

It should be understood that, in the embodiment of the present disclosure, the radio frequency unit 901 may be configured to receive and send signals during the process of receiving and sending information or during a call. Specifically, the downlink data from the base station is received and processed by the processor 910; the uplink data is sent to the base station. Generally, the radio frequency unit 901 includes, but is not limited to, an antenna, at least one amplifier, a transceiver, a coupler, a low noise amplifier, a duplexer, and the like. In addition, the radio frequency unit 901 can also communicate with a network and other devices through a wireless communication system.

The UE provides users with wireless broadband Internet access through the network module 902, such as helping users to send and receive email, browse web pages, and access streaming media.

The audio output unit 903 may convert audio data received by the radio frequency unit 901 or the network module 902 or stored in the memory 909 into audio signals and output them as sound. The audio output unit 903 may also provide audio output (for example, a call signal receiving sound, a message receiving sound, etc.) related to a specific function performed by the UE 900. The audio output unit 903 includes a speaker, a buzzer, a receiver, and the like.

The input unit 904 is used for receiving audio or video signals. The input unit 904 may include a graphics processing unit (GPU) 9041 and a microphone 9042. The graphics processor 9041 pairs images of still pictures or videos obtained by an image capture device (such as a camera) in a video capture mode or an image capture mode data is processed. The processed image frames may be displayed on the display unit 906. The image frames processed by the graphics processor 9041 may be stored in the memory 909 (or other storage medium) or transmitted via the radio frequency unit 901 or the network module 902. The microphone 9042 can receive sound, and can process such sound into audio data. The processed audio data can be converted into a format that can be sent to a mobile communication base station via the radio frequency unit 901 in the case of a telephone call mode.

The UE 900 further includes at least one sensor 905, such as a light sensor, a motion sensor, and other sensors. Specifically, the light sensor includes an ambient light sensor and a proximity sensor. The ambient light sensor can adjust the brightness of the display panel 9061 according to the brightness of the ambient light. The proximity sensor can close the display panel 9061 and/or backlight. As a type of motion sensor, an accelerometer sensor can detect the magnitude of acceleration in various directions (usually three axes). It can detect the magnitude and direction of gravity when it is stationary, and can be configured to identify the attitude of the UE (such as horizontal and vertical screen switching, related games, Magnetometer attitude calibration), vibration recognition related functions (such as pedometer, tap), etc; sensor 905 can also include fingerprint sensor, pressure sensor, iris sensor, molecular sensor, gyroscope, barometer, hygrometer, thermometer, infrared The sensors and the like are not repeated here.

The display unit 906 is configured to display information input by the user or information provided to the user. The display unit 906 may include a display panel 9061, and the display panel 961 may be configured in the form of a Liquid Crystal Display (LCD), an Organic Light-Emitting Diode (OLED), or the like.

The user input unit 907 may be configured to receive inputted numeric or character information, and generate key signal inputs related to user settings and function control of the UE. Specifically, the user input unit 907 includes a touch panel 9071 and other input devices 9072. Touch panel 9071, also known as touch screen, can collect user's touch operations on or near it (such as the user using a finger, stylus, etc. any suitable object or accessory on touch panel 9071 or near touch panel 9071 operating). The touch panel 9071 may include two parts, a touch detection device and a touch controller. Among them, the touch detection device detects the user's touch position, and detects the signal caused by the touch operation, and transmits the signal to the touch controller; the touch controller receives touch information from the touch detection device, converts it into contact coordinates, and sends it To the processor 910, receive the command sent by the processor 910 and execute it. In addition, various types such as resistive, capacitive, infrared, and surface acoustic wave can be configured to implement the touch panel 9071. In addition to the touch panel 9071, the user input unit 907 may further include other input devices 9072. Specifically, other input devices 972 may include, but are not limited to, a physical keyboard, function keys (such as volume control keys, switch keys, etc.), a trackball, a mouse, and a joystick, and details are not described herein again.

Further, the touch panel 9071 may be overlaid on the display panel 9061. When the touch panel 9071 detects a touch operation on or near the touch panel 9071, the touch panel 9071 transmits the touch operation to the processor 910 to determine the type of the touch event. The type of event provides corresponding visual output on the display panel 9061. Although in FIG. 9, the touch panel 9071 and the display panel 9061 are implemented as two independent components to implement the input and output functions of the UE, in some embodiments, the touch panel 9071 and the display panel 9061 can be integrated and implement the input and output functions of the UE, which are not limited here.

The interface unit 908 is an interface through which an external device is connected to the UE 900. For example, the external device may include a wired or wireless headset port, an external power (or battery charger) port, a wired or wireless data port, a memory card port, a port for connecting a device with an identification module, and audio input/output (I/O) port, video I/O port, headphone port, and more. The interface unit 908 may be configured to receive an input (e.g., data information, power, etc.) from an external device and transmit the received input to one or more elements within the UE 900 or may be configured to communicate between the UE 900 and an external device.

The memory 909 may be configured to store software programs and various data. The memory 909 may mainly include a storage program area and a storage data area, where the storage program area may store an operating system, at least one application required by a function (such as a sound playback function, an image playback function, etc.), etc.; the storage data area may store data according to Data (such as audio data, phone book, etc.) created by the use of mobile phones. In addition, the memory 909 may include a high-speed random access memory, and may further include a non-volatile memory, such as at least one magnetic disk storage device, a flash memory device, or other volatile solid-state storage devices.

The processor 910 is a control center of the UE, and uses various interfaces and lines to connect various parts of the entire UE. By running or executing software programs and/or modules stored in the memory 909, and calling data stored in the memory 909, execution is performed. Various functions and processing data of the UE, so as to monitor the UE as a whole. The processor 910 may include one or more processing units; preferably, the processor 910 may integrate an application processor and a modem processor, wherein the application processor mainly processes an operating system, a user interface, and an application program, etc. The processor mainly handles wireless communication. It can be understood that the foregoing modem processor may not be integrated into the processor 910.

The UE 900 may further include a power supply 911 (such as a battery) for supplying power to various components. Optionally, the power supply 911 may be logically connected to the processor 910 through a power management system, so as to manage charging, discharging, and power consumption management through the power management system. Features.

In addition, the UE 900 may further include some functional modules that are not shown, and details are not described herein again.

In addition, a computer-readable storage medium is further provided in an embodiment of the present disclosure, where a computer program is stored in the computer-readable storage medium, and the computer program is executed by a processor to perform each process of the foregoing method embodiment of processing beam failure recovery, and may achieve the same technical effects, in order to avoid repetition, will not repeat them here. The computer-readable storage medium is, for example, a read-only memory (ROM), a random access memory (RAM), a magnetic disk, or an optical disk.

It should be noted that, in this article, the terms "comprising", "comprise" or any other variants thereof are intended to cover non-exclusive inclusion, so that a process, method, article or device including a series of elements includes not only those elements, It also includes other elements not explicitly listed, or elements inherent to such a process, method, article, or device. Without more restrictions, an element limited by the sentence "comprising a . . . " does not exclude that there are other identical elements in the process, method, article, or device that includes the element.

Through the description of the above embodiments, those skilled in the art can clearly understand that the methods in the above embodiments can be implemented by means of software plus a necessary universal hardware platform, and of course, also by hardware, but in many cases the former is better. Implementation. Based on such an understanding, the technical solution of the present disclosure, in essence, or a part that contributes to the prior art, can be embodied in the form of a software product, which is stored in a storage medium (such as ROM/RAM, magnetic disk, optical disc) includes several instructions for causing a UE (which may be a mobile phone, a computer, a server, an air conditioner, or a network device, etc.) to execute the methods described in the embodiments of the present disclosure.

The embodiments of the present disclosure have been described above with reference to the drawings, but the present disclosure is not limited to the above embodiments, and the above embodiments are merely schematic and not restrictive. Those of ordinary skill in the art, based on the present disclosure, may make many forms without departing from the scope of the present disclosure and the scope of the claims, all of the forms shall fall into the scope of the present disclosure.

What is claimed is:

1. A method of processing beam failure recovery, performed by a User Equipment (UE), comprising:
controlling a behavior of monitoring a target beam by the UE and a behavior of monitoring a Radio Link Monitoring (RLM) process by the UE in the case that a preset condition for beam failure recovery is met;
declaring a Radio Link Failure (RLF) or receiving data through the target beam;
the preset condition of the beam failure recovery is after the beam failure recovery of the UE fails, or when requesting a beam failure recovery of the UE, or within a preset period after requesting a beam failure recovery of the UE;
the RLM process corresponds to, one or more RLM monitoring thresholds, one or more RLM counters or timers, one or more reference signals RS for RLM, or one or more broadband part BWPs;
wherein the controlling the behavior of monitoring the target beam of the UE and the behavior of monitoring the RLM process of the UE in the case that the preset condition for beam failure recovery is satisfied comprises:
controlling the UE to monitor the target beam, in the case that a beam failure recovery of the UE fails; or
controlling the UE to stop monitoring the RLM process, in the case that a beam failure recovery of the UE fails; or
controlling the UE to stop monitoring the RLM process, when requesting a beam failure recovery of the UE or during a preset period after requesting a beam failure recovery of the UE;
wherein the target beam comprises all or a part of candidate beams.

2. The method according to claim 1, wherein the UE is controlled to monitor the target beam in the case that the beam failure recovery of the UE fails, and the declaring the RLF or receiving the data through the target beam comprises:
declaring the RLF in the case that a preset condition for RLF is met, in a target beam monitoring process; or
receiving, in the case that an available target beam is monitored, the data through the available target beam, in a target beam monitoring process.

3. The method according to claim 2, wherein subsequent to the receiving, in the case that the available target beam is monitored, the data through the available target beam, in the target beam monitoring process, the method further comprises:
sending synchronization indication information for the RLM to a UE upper layer; or
sending indication information to a UE upper layer;
wherein the indication information is configured to indicate at least one of: the UE upper layer restarts the RLM directly, the UE upper layer stops the RLM directly, and the UE upper layer stops a timer configured to control the RLM.

4. The method according to claim 1, wherein the UE is controlled to stop monitoring the target beam and to monitor the RLM process in the case that the beam failure recovery of the UE fails, the declaring the RLF or receiving the data through the target beam comprises:
declaring the RLF in the case that a preset condition of the RLF is met, in a RLM process monitoring process; or
receiving the data through the target beam in the case that a preset number of synchronization indication information is received, in a RLM process monitoring process;
wherein the preset number of synchronization indication information are continuous.

5. The method according to claim 1, wherein the target beam further comprises at least one of:
a beam in a beam list for beam management;
a beam corresponding to beam information stored in the UE; or
a beam for RLM.

6. The method according to claim 1, wherein the UE is controlled to stop monitoring the RLM process in the case that the beam failure recovery of the UE fails, the declaring the RLF or receiving the data through the target beam comprises:

declaring the RLF directly, or controlling a timer configured to control RLM to restart or continue running and declaring the RLF in the case that the timer expires.

7. The method according to claim 1, wherein the UE is controlled to stop monitoring the RLM process when requesting the beam failure recovery of the UE or during the preset period after requesting the beam failure recovery of the UE, the declaring the RLF or receiving the data through the target beam comprises:

declaring the RLF directly in the case that the beam failure recovery of the UE fails, or controlling a timer configured to control RLM to restart or continue running and declaring the RLF in the case that the timer expires, or receiving the data through the target beam in the case that the beam failure recovery of the UE is successful.

8. The method according to claim 7, further comprising:
sending, to a UE upper layer, indication information configured to indicate that the beam failure recovery fails, in the case that the beam failure recovery of the UE fails;
or,
the method further comprises:
sending, to a UE upper layer, indication information configured to indicate that the beam failure recovery is successful, in the case that the beam failure recovery of the UE is successful; and
resuming or restarting monitoring the RLM process in the case that the beam failure recovery of the UE is successful.

9. The method according to claim 1, wherein in the case that there are a plurality of RLM processes, the controlling the UE to stop monitoring the RLM process comprises:
controlling the UE to stop monitoring a part or all of the RLM processes;
wherein in the case that the monitoring of a part of the RLM processes is stopped, for the part of the RLM processes of which the monitoring is stopped, no in-sync indication information or out-of-sync indication information is sent to a UE upper layer.

10. A User Equipment (UE), comprising: a memory, a processor and a program stored in the memory and executable on the processor, wherein the program is executed by the processor to:
control a behavior of monitoring a target beam by the UE and a behavior of monitoring a Radio Link Monitoring (RLM) process by the UE in the case that a preset condition for beam failure recovery is met;
declare a Radio Link Failure (RLF) or receive data through the target beam;
the preset condition of the beam failure recovery is after the beam failure recovery of the UE fails, or when requesting a beam failure recovery of the UE, or within a preset period after requesting a beam failure recovery of the UE;
the RLM process corresponds to, one or more RLM monitoring thresholds, one or more RLM counters or timers, one or more reference signals RS for RLM, or one or more broadband part BWPs;
wherein the program is executed by the processor to:
control the UE to monitor the target beam, in the case that a beam failure recovery of the UE fails; or control the UE to stop monitoring the RLM process, in the case that a beam failure recovery of the UE fails; or
control the UE to stop monitoring the RLM process, when requesting a beam failure recovery of the UE or during a preset period after requesting a beam failure recovery of the UE;
wherein the target beam comprises all or a part of candidate beams.

11. The UE according to claim 10, wherein the UE is controlled to monitor the target beam in the case that the beam failure recovery of the UE fails, and the program is executed by the processor to:
declare the RLF in the case that a preset condition for RLF is met, in a target beam monitoring process; or
receive, in the case that an available target beam is monitored, the data through the available target beam, in a target beam monitoring process.

12. The UE according to claim 11, wherein the program is executed by the processor to:
after monitoring an available target beam and receiving the data through the available target beam, send synchronization indication information for the RLM to a UE upper layer or send indication information to a UE upper layer;
wherein the indication information is configured to indicate at least one of: the UE upper layer restarts the RLM directly, the UE upper layer stops the RLM directly, and the UE upper layer stops a timer configured to control the RLM.

13. The UE according to claim 10, wherein the UE is controlled to stop monitoring the target beam and to monitor the RLM process in the case that the beam failure recovery of the UE fails, the program is executed by the processor to:
declare the RLF in the case that a preset condition for the RLF is met, in a RLM process monitoring process; or
receive the data through the target beam in the case that a preset number of synchronization indication information is received, in a RLM process monitoring process;
wherein the preset number of synchronization indication information are continuous.

14. The UE according to claim 10, wherein the target beam further comprises at least one of:
a beam in a beam list for beam management;
a beam corresponding to beam information stored in the UE; or
a beam for RLM.

15. The UE according to claim 10, wherein the UE is controlled to stop monitoring the RLM process in the case that the beam failure recovery of the UE fails, the program is executed by the processor to:
declare the RLF directly, or control a timer configured to control RLM to restart or continue running and declare the RLF in the case that the timer expires.

16. The UE according to claim 10, wherein the UE is controlled to stop monitoring the RLM process when requesting the beam failure recovery of the UE or during the preset period after requesting the beam failure recovery of the UE, the program is executed by the processor to:
declare the RLF directly in the case that the beam failure recovery of the UE fails, or control a timer configured to control RLM to restart or continue running and declare the RLF in the case that the timer expires, or receive the data through the target beam in the case that the beam failure recovery of the UE is successful.

17. The UE according to claim 16, wherein the program is executed by the processor to:

send, to a UE upper layer, indication information configured to indicate that the beam failure recovery fails, in the case that the beam failure recovery of the UE fails; or, the program is executed by the processor to:

send, to a UE upper layer, indication information configured to indicate that the beam failure recovery is successful, in the case that the beam failure recovery of the UE is successful;

resume or restart monitoring the RLM process in the case that the beam failure recovery of the UE is successful.

18. The UE according to claim 10, wherein in the case that there are a plurality of RLM processes, the program is executed by the processor to:

control the UE to stop monitoring a part or all of the RLM processes;

wherein in the case that the monitoring of a part of the RLM processes is stopped, for the part of the RLM processes of which the monitoring is stopped, no in-sync indication information or out-of-sync indication information is sent to a UE upper layer.

* * * * *